US007053163B1

United States Patent
Tian et al.

(10) Patent No.: US 7,053,163 B1
(45) Date of Patent: May 30, 2006

(54) CONTROLLED COMONOMER DISTRIBUTION ALONG A REACTOR FOR COPOLYMER PRODUCTION

(75) Inventors: Jun Tian, La Porte, TX (US); David Rauscher, Angleton, TX (US); William Gauthier, Houston, TX (US); Mark C. Douglass, League City, TX (US); Nelson Black, Pasadena, TX (US); Ronald Tharappel, Missouri City, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 11/063,028

(22) Filed: Feb. 22, 2005

(51) Int. Cl.
*C08F 210/06* (2006.01)
*C08F 2/34* (2006.01)

(52) U.S. Cl. .......................... 526/348; 526/64; 526/87; 526/901

(58) Field of Classification Search .................. 526/64, 526/87, 348, 901
See application file for complete search history.

(56) References Cited

U.S. PATENT DOCUMENTS

| 3,546,189 | A | * | 12/1970 | Ebster | .......................... 526/64 |
| 6,727,332 | B1 | | 4/2004 | Demain | |
| 2003/0114608 | A1 | | 6/2003 | Tharappel et al. | |
| 2004/0116625 | A1 | * | 6/2004 | Hottovy et al. | ................ 526/64 |

* cited by examiner

*Primary Examiner*—Fred Teskin
(74) *Attorney, Agent, or Firm*—Tenley R. Krueger

(57) ABSTRACT

The tendency of copolymer fluff grains of propylene and ethylene to agglomerate is reduced by injecting at least one olefin comonomer, such as ethylene monomer, into more than one point along the length of the reactor, rather than injecting all of the ethylene at one point. This process reduces the tendency of copolymer fluff grains to agglomerate and cause processing problems as compared with injecting the comonomer at only one point. Copolymer made by this process is expected to have lower substantially amorphous polypropylene content and better organoleptics than copolymer made where the ethylene is injected at only one point. In one non-limiting embodiment the copolymerization reactor is a loop-type reactor.

24 Claims, 1 Drawing Sheet

CONTROLLED COMONOMER DISTRIBUTION ALONG A REACTOR FOR COPOLYMER PRODUCTION

FIELD OF THE INVENTION

The present invention relates to a process for the production of random copolymers, and relates more particularly in one non-limiting embodiment to producing copolymers of propylene by a process that reduces the tendency of the copolymer fluff grains to agglomerate.

BACKGROUND OF THE INVENTION

Polypropylene and polypropylene copolymers may be formed in a polymerization reactor in the presence of an appropriate catalyst. Propylene monomer is introduced into the reactor, alone or in combination with one or more other comonomers, such as ethylene, to produce the polypropylene homopolymer or copolymer fluff or granules. The propylene polymer is withdrawn from the reactor and may be subjected to appropriate processing steps and then extruded as a thermoplastic mass through an extruder and die mechanism to produce the propylene polymer as a raw material in particulate form, usually as pellets. The propylene polymer pellets are ultimately heated and processed in the formation of the desired end products. Examples of such end products include, but are not necessarily limited to, fibers, webs (both woven and nonwoven), films, pipe, containers, and foamed articles. Other examples of such products made from propylene polymers include component parts of durable goods articles such as automotive interior and exterior components, and household appliance interior and exterior components One form of reactor suitable for polypropylene homopolymer and copolymer production is a bulk loop reactor. A bulk loop reactor may be formed from one or more interconnected loops having a continuous bore. The catalyst is distributed within the continuous bore by circulating liquid propylene monomer. In this way, propylene polymer polymerization occurs within the continuous bore. Such reactors may also be called slurry loop reactors. Two or more bulk loop reactors may be connected, such as for example in series. Herein, all of these reactors are termed "loop-type" reactors. In this way, the polymerization conditions in each reactor may be the same or different to achieve desired polymer properties. Examples of polymerization conditions that may be varied include temperature, pressure, monomer content, comonomer content, catalyst, co-catalyst, residence time, and, optionally, hydrogen concentration.

Optionally, the propylene in a mixture of reaction medium and catalyst may form a mixture or "paste", along with any co-catalyst or internal or external electron donor, if used, may be placed into a pre-polymerization reactor, which may be a loop reactor, prior to introduction into the main slurry loop reactor. Propylene polymer granules are formed as propylene polymerization begins upon contact between the catalyst/co-catalyst and the liquid propylene monomer, all of which are circulated within the pre-polymerization loop reactor by a circulation pump.

Polymer particles exiting the bulk loop reactor may be subjected to processing steps as described above or they may be introduced into one or more additional polymerization reactors, such as for example one or more gas phase reactors, for further polymerization with other monomers, such as ethylene, to alter the physical and chemical properties of the propylene polymer resins. Additionally, the physical and chemical properties of the propylene polymer resin may be tailored by the selection of one or more catalyst systems.

Because bulk loop reactors can produce propylene polymers on a substantially continuous basis, and at high outputs over an extended period of time, such as for example, from between 1 to at least 50 tons of propylene polymer per hour for between 5 days to up to 2 years and beyond, bulk loop reactors offer several advantages over other types of polypropylene reactors, such as stirred pot, stirred bed, and other non-substantially continuous reactors.

Copolymers of polypropylene having low melting points may be obtained by inserting comonomers in the polymer chain during polymerization. The addition of ethylene and/or other comonomers in the growing chains of polypropylene during polymerization gives rise to a propylene copolymer that may be characterized by a lower melting point, a lower flexural modulus, lower rigidity, higher transparency and lower crystallinity than the homopolymers of propylene. The comonomers may generate defects in the polymer chain which impede the growth of thick crystalline structures and reduce the degree of crystallinity of the overall polymer. The comonomers are not evenly distributed in the polymer chains. Among the many comonomers that may be used in the copolymerization process, ethylene and butene have been most common. It has been observed that the melting temperature of the propylene copolymers is reduced by about 6° C. per wt % of inserted ethylene in the copolymer chain or by about 3° C. per wt % of inserted butene. The addition of comonomer in industrial polymerization processes has other effects than just decreasing the melting temperature of the polypropylene; it has both economical and technical effects.

Besides using Ziegler-Natta (ZN) catalysts, new metallocene catalysts show potential to produce this type of material in loop reactors. However, due to stickiness of this soft material, the copolymer fluff grains tend to agglomerate and thus cause the circulation power (amps) to increase and become erratic and thus discontinue the steady production. In fact, severe agglomeration would generate relatively large copolymer accumulations or "rocks", and even render post-reactor process suspended (e.g. due to the plugging of valves, etc.). The copolymer agglomerations may cause undesirable vibration in the pump motors and the reactor itself. Generally, the copolymer fluff grains may lose bulk density, that is lose mass per unit volume that the fluff grains occupy. This results in circulator problems and decreases the production rate (throughput).

Another situation aggravated by copolymer fluff stickiness concerns devolatizing the fluff grains of the reaction medium. Generally, after the polymerization is ceased by deactivating or "killing" the catalyst, the copolymer fluff granules are heated so that upon entering a flash tank, a substantial portion of the liquid propylene monomer and/or reaction medium accompanying the copolymer fluff granules vaporizes, thus separating from the granules. The gaseous propylene and a portion of polymerization by-products are extracted from the flash tank. A nitrogen purge may be optionally used to remove the last of the propylene or reaction medium. Suitable kill materials may be one of many known protic substances, having an active hydrogen including, but not necessarily limited to, heteroatom-containing materials, e.g. alcohols, glycols, amines, $CO_2$, CO, etc.

It is desirable that the copolymer fluff granules are small, spherical and uniform so that excess propylene and/or reaction medium may be easily removed. If the granules become too big, it is difficult to get all of the propylene and/or reaction medium out of the fluff. Pellets containing excess diluent or reaction medium may be explosive, and granules having propylene may catch fire.

Other difficulties may occur when the copolymer granules exit the flash tank if they contain appreciable amounts of diluent or reaction medium. The conveying equipment moving the fluff granules may not function properly and gravity feeds will not work properly if the fluff is sticky.

Thus, alleviating the stickiness and agglomeration tendency of the copolymer fluff inside the loop media but retaining the same melting point in the final pellets would be helpful to resolving this technical challenge. The stickiness appears to be related to the amount of the amorphous part, which is associated to the comonomer (e.g. ethylene) content for a specific catalyst system under steady polymerization conditions. Higher amorphous content dispersed among the crystalline domains is believed to make the fluff stickier, without wishing to be limited to any particular theory.

Other techniques and methods have been used to attempt to improve fluff particle morphology. For instance, changes in reaction temperature, varying the copolymer bulk density, using a different catalyst or external electron donor used as separate or combined improvements may help improve fluff morphology and circulation. Prepolymerization has also been used to give better fluff morphology, and the comonomer addition rate may also affect particle morphology.

It is a continuing goal of the industry to produce RCP having improved properties, such as a melting point on the order of about 100 to about 170° C. and reduced tendency of the RCP fluff to agglomerate or stick together during manufacturing and post-reactor finishing.

SUMMARY OF THE INVENTION

There is provided, in one non-limiting form, a process for producing a copolymer that includes polymerizing in a linear liquid slurry or gas phase reactor a polypropylene product from propylene in the presence of a polymerization catalyst that involves injecting at least one olefin comonomer at more than one point along the length of the reactor. Of course, more than one comonomer may be used. A copolymer of propylene and olefin comonomer is recovered. Polymerization in the presence of hydrogen is optional.

There is additionally provided in another non-restrictive embodiment a copolymer produced by a process that involves polymerizing in a linear liquid slurry or gas phase reactor a polypropylene product from propylene in the presence of a polymerization catalyst. The process includes injecting an olefin comonomer at more than one point along the length of the reactor. A copolymer of propylene and olefin comonomer may be recovered that has more uniform distribution of olefin comonomer as compared to a copolymer produced by an otherwise identical process except that the olefin comonomer is injected at one point.

In another non-limiting embodiment, there are provided fibers, films or sheet materials formed into an article such as bags, containers, and tubes using techniques such as blowing and extrusion.

DETAILED DESCRIPTION OF THE INVENTION

Figure 1:
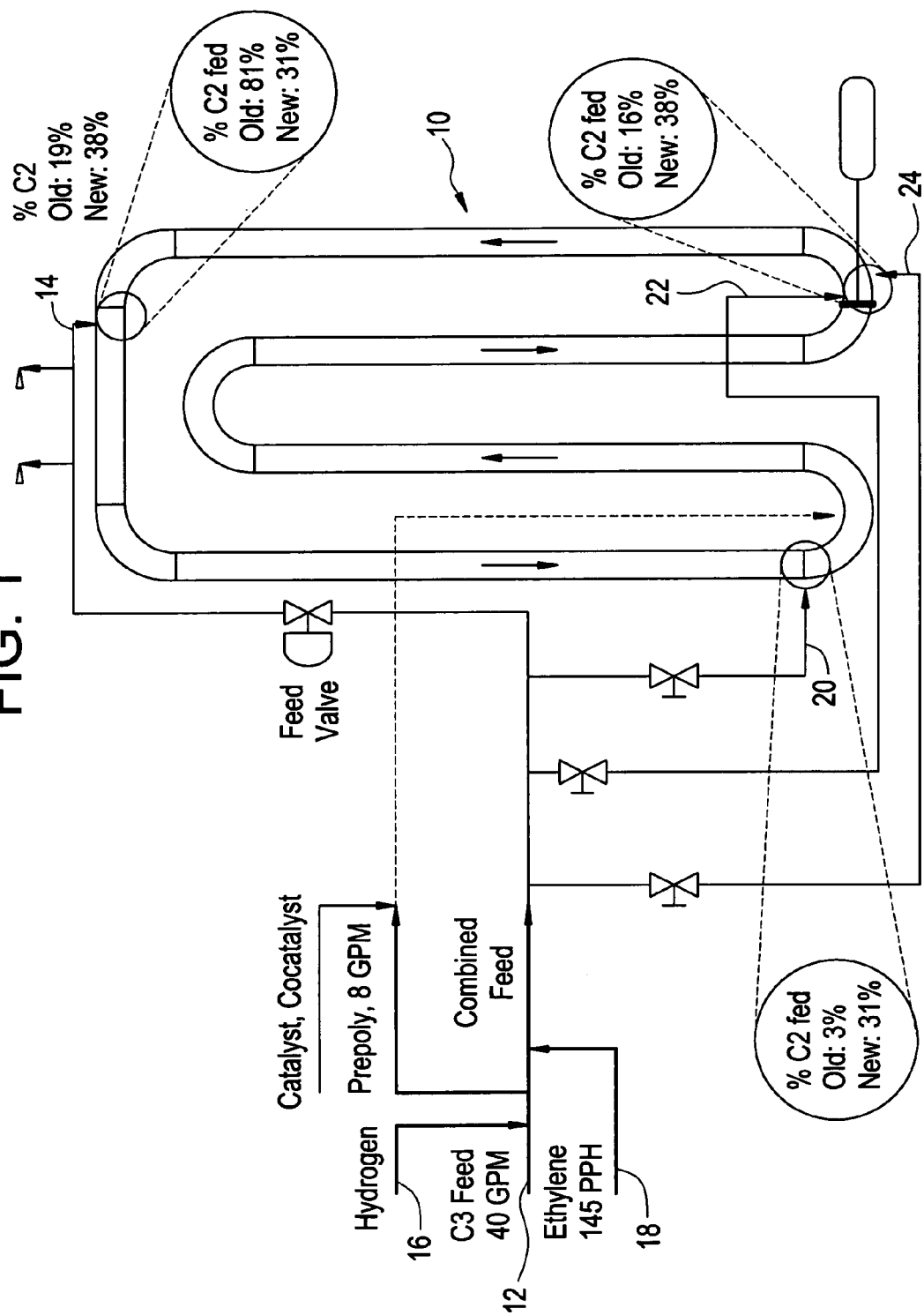
FIG. 1 is a schematic diagram and outline of a polymerization reactor showing multiple olefin comonomer injection points.

The present invention relates to an improved production of copolymer of propylene with enhanced properties, particularly a method that has reduced stickiness of the soft materials, namely the copolymer fluff grains. This improved process would reduce the tendency of the fluff to agglomerate and reduce the possibility that circulation power would undesirably increase and also reduce the possibility that valves would be blocked by severe agglomeration, or relatively large and troublesome accumulations informally termed "rocks". Indeed, when copolymer fluff granules become too large, they create noise while circulating through the reactor and when they contact the mixing paddle, sounding similar to what gravel may sound like.

In the process herein, the olefin comonomer (e.g. ethylene) distribution would be expected to be steadier or more uniformly distributed among both inter- and intramacromolecules, thus providing lower organoleptic content. Organoleptic considerations refer to the phenomenon of organic compounds that may leach into food from the polymer wrapping, thereby altering the taste and/or odor of the food. In one non-limiting embodiment, this is expected to be related to the xylene soluble (XS) or non-crystalline fraction and thus it is desirable to reduce the XS content of the polymer. Because it is anticipated that the distributed olefin comonomer will reduce the amorphous content, it is expected that the method described herein will improve the organoleptic content of the copolymers.

It has been discovered that with little modification and capital investment to current production processes, the careful selection of metallocene or Ziegler-Natta catalysts and their support carriers would effectively overcome and even expand the production confinement of copolymer resins, and particularly through the modification of the reactor process by relatively more evenly distributing the ethylene and/or other comonomer concentration along the whole reactor or loop. A more even distribution of olefin comonomer along the length of the process stream or reactor would be one where the concentration of olefin comonomer in the process stream would be the same at any point; as a practical matter this would be impossible since it would likely require injection of olefin comonomer at nearly every point in the pathway. Instead, the olefin comonomer is distributed approximately evenly over the length of the reactor or loop. It will be appreciated that the comonomer may advantageously be mixed with additional monomer (e.g. propylene) prior to introduction, or the comonomer may be introduced without any additional monomer at the injection point.

By "approximately evenly distributed" is meant that the concentration of the olefin comonomer at any point does not vary significantly from the concentration based on the total feed proportion. It will be appreciated that improvements in the polymerization process and product will result even if the olefin comonomer is injected at multiple points, but even if the distribution is not approximately even. Indeed, one measure of the fact that the comonomer is more evenly distributed is that no other modifications in the copolymer production is necessary to address copolymer fluff morphology and to permit production to operate smoothly.

It is expected that the distributed olefin comonomer injection method may be applied to conventional liquid slurry or gas phase reactors. Additionally, although ethylene is also frequently used herein as the representative olefin comonomer, it will be appreciated that other olefin comonomer besides ethylene may be employed, including, but not necessarily limited to butene, hexene, octene, and the like, and that in some instances more than one olefin comonomer may be used with propylene.

It will be appreciated that the molecular weight distribution of the copolymer product may be varied by a number of factors including, but not necessarily limited to, catalyst selection (whether ZN or metallocene, e.g., and what kind), presence and kind of external electron donors, presence of hydrogen and concentration levels, reaction temperature, number of and type of reactors used, and presumably how the comonomer is distributed.

Conventional Ziegler-Natta Catalysts

Traditionally, catalyst systems used in bulk loop reactors for the commercial production (in one non-limiting embodiment, polymer production in the range of between 1 and up to 5 tons/hour and desirably between at least 1 ton to at least 50 tons/hour over a period of between at least about 5 days up to at least about 2 years) of polypropylene homopolymers and/or copolymers are commonly know as conventional Ziegler-Natta catalyst systems (hereafter may also be referred to as "Ziegler-Natta catalysts" or "Ziegler-Natta catalyst systems" or ZN catalysts). Suitable conventional Ziegler-Natta catalysts are disclosed in, for example, U.S. Pat. Nos. 4,701,432; 4,987,200; 3,687,920; 4,086,408; 4,376,191; 5,019,633; 4,482,687; 4,101,445; 4,560,671; 4,719,193; 4,755,495; and 5,070,055, each of which is incorporated by reference herein in its entirety. These Ziegler-Natta catalyst systems may include a support, one or more internal donors, and one or more external donors.

Conventional Ziegler-Natta catalysts are stereospecific complexes formed from a transition metal halide and a metal alkyl or hydride and may produce isotactic polypropylenes. The Ziegler-Natta catalysts are derived from a halide of a transition metal, such as titanium, chromium or vanadium with a metal hydride and/or metal alkyl, typically an organoaluminum compound as a co-catalyst. The catalyst is usually comprised of a titanium halide supported on a magnesium compound. Ziegler-Natta catalysts, such as titanium tetrachloride ($TiCl_4$) supported on an active magnesium dihalide, such as magnesium dichloride or magnesium dibromide, as disclosed, for example, in U.S. Pat. Nos. 4,298,718 and 4,544,717, both incorporated by reference herein, are supported catalysts. Silica may also be used as a support. The supported catalyst may be employed in conjunction with a co-catalyst such as an alkylaluminum compound, for example, triethylaluminum (TEAL), trimethyl aluminum (TMAL) and triisobutyl aluminum (TIBAL).

Conventional Ziegler-Natta catalysts may be used in conjunction with one or more internal electron donors. These internal electron donors are added during the preparation of the catalysts and may be combined with the support or otherwise complexed with the transition metal halide. Typical internal donors may include phthalates, diethers, succinates or the like. The Ziegler-Natta catalyst is typically a supported catalyst. Suitable support materials include magnesium compounds, such as magnesium halides, dialkoxymagnesiums, alkoxymagnesium halides, magnesium oxyhalides, dialkylmagnesiums, magnesium oxide, magnesium hydroxide, and carboxylates of magnesium. Typical magnesium levels are from about 12% to about 20% by weight of catalyst, and typical titanium levels are from about 1% to about 6% by weight of catalyst.

Conventional Ziegler-Natta catalysts may also be used in conjunction with one or more external donors. Generally such external donors act as stereoselective control agents to control the amount of substantially amorphous or non-stereoregular polymer produced during the reaction, thus reducing the amount of xylene solubles. Examples of external donors include the organosilicon compounds such as cyclohexylmethyl dimethoxysilane (CMDS), dicyclopentyl dimethoxysilane (CPDS) and diisopropyl dimethoxysilane (DIDS). External donors, however, may reduce catalyst activity and may tend to reduce the melt flow of the resulting polymer.

Metallocene Catalyst Systems

Other catalyst systems useful for polymerizing propylene are based upon metallocenes. However, unlike Ziegler-Natta catalysts, metallocenes traditionally have not been used in bulk loop reactors and more particularly, have not been used in bulk loop reactors to produce commercial quantities of polypropylene homopolymer and/or co-polymer. However, the distributed comonomer innovation herein may permit metallocene catalysts to be more widely used in slurry loop reactors or gas phase reactors. Metallocenes may be characterized generally as coordination compounds incorporating one or more cyclopentadienyl (Cp) group (which may be substituted or unsubstituted and may be the same or different) coordinated with a transition metal through $\pi$-bonding. The Cp groups may also include substitution by linear, branched or cyclic hydrocarbyl radicals and desirably cyclic hydrocarbyl radicals so as to form other contiguous ring structures, including, for example indenyl, azulenyl and fluorenyl groups. These additional ring structures may also be substituted or unsubstituted by hydrocarbyl radicals and desirably C1–C20 hydrocarbyl radicals. Metallocene compounds may be combined with an activator and/or cocatalyst (as described in greater detail below) or the reaction product of an activator and/or cocatalyst, such as for example methylaluminoxane (MAO) and optionally an alkylation/scavenging agent such as trialkylaluminum compound (TEAL, TMA and/or TIBAL). Various types of metallocenes are known in the art which may be supported.

Typical supports may include, but are not necessarily limited to, any support such as talc, an inorganic oxide, clay, and clay minerals, ion-exchanged layered compounds, diatomaceous earth, silicates, zeolites or a resinous support material such as a polyolefin. Specific inorganic oxides include silica and alumina, used alone or in combination with other inorganic oxides such as magnesia, titania, zirconia and the like. Non-metallocene transition metal compounds, such as titanium tetrachloride, may also be incorporated into the supported catalyst component. The inorganic oxides used as support are characterized as having an average particle size ranging from 5–600 microns, desirably from 10–100 microns, a surface area of 50–1,000 square meters per gram, desirably from 100–400 square meters per gram, a pore volume of 0.5–3.5 cc/g, desirably from about 0.5–2 cc/g.

Many metallocenes may be used in the methods discussed herein. As used herein unless otherwise indicated, "metallocene" includes a single metallocene composition or two or more metallocene compositions. Metallocenes are typically bulky ligand transition metal compounds generally represented by the formula:

$$[L]_m M[A]_n \qquad (1)$$

where L is a bulky ligand, A is a leaving group, M is a transition metal and m and n are such that the total ligand valency corresponds to the transition metal valency.

The ligands L and A may be bridged to each other, and if two ligands L and/or A are present, they may be bridged. The metallocene compound may be full-sandwich compounds having two or more ligands L which may be cyclopentadienyl ligands or cyclopentadiene derived ligands or half-sandwich compounds having one ligand L, which is a cyclopentadienyl ligand or cyclopentadienyl derived ligand. The transition metal atom may be a Group 4, 5, or 6 transition metal and/or a metal from the lanthanide and actinide series. Zirconium, titanium, and hafnium are desirable. Other ligands may be bonded to the transition metal, such as a leaving group, such as but not limited to hydrocarbyl, hydrogen or any other univalent anionic ligand. A bridged metallocene, for example may, be described by the general formula:

$$RCpCp'MeQn \qquad (2)$$

Me denotes a transition metal element and Cp and Cp' each denote a cyclopentadienyl group, each being the same or different and which may be either substituted or unsubstituted, Q is an alkyl or other hydrocarbyl or a halogen group, n is a number and may be within the range of 1–3 and R is a structural bridge extending between the cyclopentadienyl rings. Heteroatoms may be incorporated into the ring structures or bridging groups. Metallocene catalysts and metallocene catalysts systems that produce isotactic polyolefins are disclosed in U.S. Pat. Nos. 4,794,096 and 4,975,403 which are incorporated by reference herein. These patents disclose chiral, stereorigid metallocene catalysts that polymerize olefins to form isotactic polymers and are especially useful in the polymerization of highly isotactic polypropylene.

Suitable metallocene catalysts are disclosed in, for example, U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,132,381; 5,155,180; 5,198,401; 5,278,119; 5,304,614; 5,324,800; 5,350,723; 5,391,790; 5,436,305; 5,510,502; 5,145,819; 5,243,001; 5,239,022; 5,329,033; 5,296,434; 5,276,208; 5,672,668; 5,304,614; 5,374,752; 5,510,502; 4,931,417; 5,532,396; 5,543,373; 6,100,214; 6,228,795; 6,124,230; 6,114,479; 6,117,955; 6,087,291; 6,140,432; 6,245,706; 6,194,341; 6,399,723; 6,380,334; 6,380,331; 6,380,330; 6,380,124; 6,380,123; 6,380,122; 6,380,121; 6,380,120; 6,376,627; 6,376,413; 6,376,412; 6,376,411; 6,376,410; 6,376,409; 6,376,408; 6,376,407; 5,635,437; 5,554,704; 6,218,558; 6,252,097, 6,255,515 and EP 549 900; 576 970; and 611 773; and WO 97/32906; 98/014585; 98/22486; and 00/12565, each of which is incorporated by reference herein in its entirety.

Metallocene Activators

Metallocenes may be used in combination with some form of activator in order to create an active catalyst system. The term "activator" is defined herein to be any compound or component, or combination of compounds or components, capable of enhancing the ability of one or more metallocenes to polymerize olefins to polyolefins. Alklyalumoxanes such as methylalumoxane (MAO) are commonly used as metallocene activators. Generally alkylalumoxanes contain about 5 to 40 of the repeating units. 1

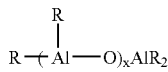

for linear species and

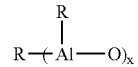

for cyclic species where R is a C1–C8 alkyl including mixed alkyls. Particularly desirable are the compounds in which R is methyl. Alumoxane solutions, particularly methylalumoxane solutions, may be obtained from commercial vendors as solutions having various concentrations. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,103,031 and EP-A-0 561 476, EP 0 279 586, EP-A-0 594 218 and WO 94/10180, each fully incorporated herein by reference. (As used herein unless otherwise stated "solution" refers to any mixture including suspensions.)

Ionizing activators may also be used to activate metallocenes. These activators are neutral or ionic, or are compounds such as tri(n-butyl)ammonium tetrakis(pentafluorophenyl)borate, which ionize the neutral metallocene compound. Such ionizing compounds may contain an active proton, or some other cation associated with, but not coordinated or only loosely coordinated to, the remaining ion of the ionizing compound. Combinations of activators may also be used, for example, alumoxane and ionizing activators in combinations, see for example, WO 94/07928.

Descriptions of ionic catalysts for coordination polymerization comprised of metallocene cations activated by non-coordinating anions appear in the early work in EP-A-0 277 003, EP-A-0 277 004 and U.S. Pat. No. 5,198,401 and WO-A-92/00333 (incorporated herein by reference). These teach a desirable method of preparation wherein metallocenes (bisCp and monoCp) are protonated by an anion precursor such that an alkyl/hydride group is abstracted from a transition metal to make it both cationic and charge-balanced by the non-coordinating anion. Suitable ionic salts include tetrakis-substituted borate or aluminum salts having fluorided aryl-constituents such as phenyl, biphenyl and napthyl.

The term "noncoordinating anion" (NCA) means an anion which either does not coordinate to said cation or which is only weakly coordinated to said cation thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion.

The use of ionizing ionic compounds not containing an active proton but capable of producing both the active metallocene cation and a noncoordinating anion is also known. See, for example, EP-A-0 426 637 and EP-A-0 573 403 (incorporated herein by reference). An additional method of making the ionic catalysts uses ionizing anion precursors which are initially neutral Lewis acids but form the cation and anion upon ionizing reaction with the metallocene compounds, for example the use of tris(pentafluorophenyl)borane, see EP-A-0 520 732 (incorporated herein by reference). Ionic catalysts for addition polymerization may also be prepared by oxidation of the metal centers of transition metal compounds by anion precursors containing metallic oxidizing groups along with the anion groups, see EP-A-0 495 375 (incorporated herein by reference).

Where the metal ligands include halogen moieties (for example, bis-cyclopentadienyl zirconium dichloride) which are not capable of ionizing abstraction under standard conditions, they may be converted via known alkylation reactions with organometallic compounds such as lithium or aluminum hydrides or alkyls, alkylalumoxanes, Grignard reagents, etc. See EP-A-O 500 944 and EP-Al-0 570 982 (incorporated herein by reference) for in situ processes describing the reaction of alkyl aluminum compounds with dihalo-substituted metallocene compounds prior to or with the addition of activating anionic compounds.

Desirable methods for supporting ionic catalysts comprising metallocene cations and NCA are described in U.S. Pat. Nos. 5,643,847; 6,228,295 and 6,143,686 (all fully incorporated herein by reference). When using the support composition, these NCA support methods generally comprise using neutral anion precursors that are sufficiently strong Lewis acids to react with the hydroxyl reactive functionalities present on the silica surface such that the Lewis acid becomes covalently bound.

Additionally, when the activator for the metallocene supported catalyst composition is a NCA, desirably the NCA is first added to the support composition followed by the addition of the metallocene catalyst. When the activator is MAO, desirably the MAO and metallocene catalyst are dissolved together in solution. The support is then contacted with the MAO/metallocene catalyst solution. Other methods and order of addition will be apparent to those skilled in the art, for instance, the catalyst may be made by mixing the MAO and the support, and then adding the metallocene component.

Bulk Loop Reactor

An example of a bulk loop reactor system 10 suitable for propylene polymerization using one or more conventional Zeigler-Natta catalysts or metallocene catalysts is illustrated in FIG. 1. The bulk loop reactor system 10 may include a catalyst mixing and injection system upstream of and in communication with four-legged loop reactor 10, a polymer recovery system downstream of the loop reactors 10 and optionally a gas phase reactor. It will be understood that the bulk loop reactor system may include a single loop reactor or single gas phase reactor or multiple loop reactors and multiple gas phase reactors or any combination thereof, including one or more other olefin polymerization reactors, such as other propylene polymerization reactors. The bulk loop reactors 10 may further include a propylene feed conduit 12 and a co-monomer (such as for example, ethylene) feed conduit 18.

The catalyst mixing and injection system may include a mixing vessel that in turn includes a mixing paddle and a heating jacket. A high molecular weight mineral oil (diluent) and the Ziegler-Natta catalyst may be introduced into the mixing vessel. Generally the high molecular weight oil may be heated to a sufficient temperature (in the range of from about 30° C. to at least 90° C., depending upon the type of mineral oil used) in order to reduce the viscosity of the mineral oil and allow the mixing paddle to sufficiently mix the catalyst and high molecular weight mineral oil. The heated mixture of high molecular weight mineral oil and catalyst is then conveyed via conduit to an injector where it may cool and form a "paste". The paste is urged during the compression stroke of a plunger into conduit and into another mixing vessel wherein a co-catalyst, such as TEAL, and one or more electron donors may be blended with the paste by the mixing paddle. The resulting mixture of catalyst, co-catalyst and electron donor may exit the mixing vessel and is metered by a pump into an optional pre-polymerization loop reactor containing liquid propylene monomer. Polymerization temperatures in the pre-polymerization loop reactor may be from between −10 and 10° C. and are controlled by cooling jackets. Propylene polymer granules are formed as propylene polymerization begins upon contact between the catalyst/co-catalyst and the liquid propylene monomer, all of which are circulated within the pre-polymerization loop reactor by a circulation pump.

Pre-polymerization cycle time may last between 7 and at least 30 minutes, alternatively between 15 and 20 minutes before the propylene polymer granules are conveyed via conduit into a loop reactor 10 containing liquid propylene monomer. A circulating pump circulates the propylene granules and liquid propylene monomer within the loop reactor 10. As propylene polymerization continues in the first loop reactor, the propylene polymer granules increase in size. The loop reactor cycle time may last between 20 and at least 95 minutes, in one non-limiting, alternative embodiment between 30 and 50 minutes before the propylene polymer granules are conveyed via a conduit into an optional second loop reactor. Polymerization temperatures in the first 10 and second loop reactors, may range from between 66 to 77° C. and are optionally controlled by cooling jackets (not shown). A second loop reactor cycle time may last between 10 and at least 60 minutes, alternatively between 20 and 50 minutes before the propylene polymer granules are conveyed via a conduit into the polymer recovery system. Generally, if no further olefin polymerization is desired, the catalyst is deactivated or "killed" before entering the polymer recovery system.

As previously mentioned, a heating column receives the propylene polymer granules from the reactor 10. Sufficient heat is applied to the propylene polymer granules such that upon entering a flash tank from the conveying conduit, a substantial portion of the liquid propylene monomer accompanying the propylene polymer granules vaporizes, thus separating from the granules. The gaseous propylene and a portion of the polymerization by-products are extracted from the flash tank via another conduit. This propylene may be recompressed, filtered, so as to remove impurities and other contaminants that may adversely react with the catalyst system, and returned to the loop reactor 10.

After exiting the flash tank, the propylene polymer granules may be directed to extruders for processing into pellets. Or, if further polymerization with one or more monomers, such as for example ethylene, is desired, the propylene polymer granules exiting the flash tank may be conveyed into a gas phase reactor. Thus, alternatively the propylene polymer granules exiting the optional gas phase reactor may be directed to extruders for processing into impact polypropylene copolymers pellets. During the pelletization process, one or more other materials, such as, for example, stabilizers, UV blockers, antistatic chemicals and/or pigments may be blended with the propylene polymer granules.

In another non-restrictive version, a more extensive polymer recovery system may be used that does not involve a gas phase reactor or a pre-polymerization loop reactor. In some instances, most, if not all, active catalyst present in the propylene polymer granules exiting the loop reactor 10 may be deactivated prior to entering the wash column. In general, propylene polymer granules separate from the liquid propylene in the wash column. In some instances, additional liquid propylene entering at or near the base of the wash column passes through the bed of settling propylene polymer granules. Liquid propylene and a portion of the polymerization by-products exit the wash column and are conveyed to a distillation vessel. The distillation vessel separates the liquid propylene from polymerization by-products, such as atactic polypropylene.

The remaining propylene polymer granules, propylene monomer and polymerization by-products exit the wash column and enter a heating column. The propylene polymer granules may exit the wash column continuously or in batches. Sufficient heat is applied to the propylene polymer granules such that upon entering the flash tank, a substantial portion of the liquid propylene monomer accompanying the propylene polymer granules vaporizes, thus separating from the granules. The gaseous propylene and other polymerization by-products are extracted from the flash tank. The gaseous propylene may be recompressed by the recycle compressor and conveyed to a distillation vessel. Liquid propylene monomer exits the distillation vessel and may be conveyed to one or more propylene feed treaters wherein the propylene may be filtered as described above before being returned to the loop reactor 10. The propylene polymer granules exit the flash tank and enter a purge column. Upon exiting the purge column, the propylene polymer granules may be directed to extruders for processing into pellets as previously described.

In one non-restrictive embodiment, polymers are prepared using a loop reactor described and maintaining the loop reactor at a steady state by controlling a flow of coolant fluid to maintain a temperature in the loop reactor at a preset point or within a specified range. The fluid is typically water, but other heat exchanging fluids, such as air, may be used. Other coolant fluids include glycols, nitrogen, and the like. One means of using coolant fluid is the use of cooling jackets. Cooling jackets may be simple or may contain baffles or other means of creating turbulence for improving the efficiency of heat removal. Cooling jackets may be continuous or in sections or dispensed with entirely in the case of cooling sprays. It will be appreciated, however, that there are many other ways to cool the process stream, including, but not necessarily limited to, flashing propylene and venting the reactor.

The catalyst system may be employed in a solution polymerization process, which is homogeneous, or a slurry process which is heterogeneous, and in many cases propylene monomer serves as the reaction medium or diluent. In some solution processes, typical diluents or reaction media include hydrocarbons with 3 to 7 carbon atoms. Illustrative examples of the useful diluents (sometimes referred to as solvents) include, but are not necessarily limited to, the alkanes such as propane, butane, isobutene, pentane, isopentane, hexane, heptane, octane and nonane; cycloalkanes such as cyclopentane and cyclohexane, and aromatics such as benzene, toluene, ethylbenzene and diethylbenzene. The copolymer should be largely insoluble in the reaction medium.

In a slurry process it is necessary to immobilize the catalyst system on an inert support, particularly a porous solid support such as talc, inorganic oxides and resinous support materials such as polyolefin. In one non-limiting embodiment, the support material is an inorganic oxide in its finely divided form. The method herein is also expected to be applicable to gas phase polymerization.

In the case of a typical Ziegler-Natta catalyst, in one non-limiting embodiment $MgCl_2$ with electron donors, one may make copolymer, but a limitation may be how much atactic polypropylene (aPP) is being produced since aPP production increases with increasing ethylene in the reactor. The aPP is soluble in hot propylene. If the aPP content is too high, then the slurry/solution viscosity in the loop reactor may increase too much and it may become very difficult to circulate and get good heat transfer. The aPP may precipitate on the walls of the reactor causing more problems. Metallocene catalyst components allow for the production of lower melting point (MP) copolymer because of the lower amount of aPP formed using typical metallocene catalyst components. The distributed olefin comonomer technique herein should alleviate the production of aPP for both types of catalyst components.

Additionally, it is desirable that the internal bore surfaces defined by the conduits and junction have minimal or no gaps, ridges, protrusions, texturing or other similar structures or features that would allow the catalyst particles and/or copolymer granules to accumulate in and/or on the bore surfaces and not be swept into the reactor by the flow through the reactor. Such gaps ridges and protrusions may be caused by, for example, gaskets, welds, non-alignment of flanges and the like. Any such particle or granule not swept into the reactor may continue to grow and/or cause other particles to accumulate, the occurrence of either or both may create a plug or obstruction in the bore. Therefore, it is desirable that the surfaces defining these bores are smoothed, such as by electropolishing, and the gaskets should be chosen to avoid gaps at the flanges. For example, it is desirable that the surfaces and/or portions thereof defining the bore have a roughness value of between 0 rms and 120 rms and desirably between 8 rms and 20 rms as measured by techniques known to those skilled in the art.

Another modification when using a conventional Ziegler-Natta catalyst system compared to using a metallocene catalyst system is the addition of an anti-fouling agent. In some instances, over a period of time, a build up of a polymer coating inside of the loop reactor, or in the product take-off line leading from the reactor can occur. The use of the anti-fouling agent prevents such polymer coatings from forming. The anti-fouling agent may be added to the propylene fed to the reactor. Or it may be added such that the anti-fouling agent is also present in the catalyst mixing and injection system, thus reducing the risk of conduit plugging.

Examples of suitable anti-fouling agents include, but are not necessarily limited to, a dinonylnaphtyl sulfonic acid based anti-fouling agent, such as Stadis 450 Conductivity Improver, a product of Octel Starreon, LLC (hereafter referred to as "Stadis"). Stadis may be used at concentrations of between 0.1 ppm and 10 ppm in the propylene feed to the reactor or in such concentrations when added directly to the catalyst mixing and injection system. Other possible antistatic agents may be used such as ethylene oxide based anti-fouling agents. Examples of an ethylene oxide/propylene oxide block copolymer anti-fouling agent are sold under the trade-names Synperonic or Pluronic, products of ICI and BASF, respectively. Synperonic or Pluronic anti-fouling agents may prevent fouling as effective as Stadis 450 with the additional advantages of minimal loss in catalyst activity at concentrations in the range of 2 ppm to 100 ppm.

Comonomer Introduction

The method described herein for introducing or injecting olefin comonomer into the process flow of a linear reactor at more than one point is expected to be useful for many previous, present and future methods and processes for producing copolymers, and is expected to be applicable over a wide variety of reaction conditions, including temperatures and pressures and is not limited to any particular temperature range, pressure range, flow velocity, etc. The method herein is also not limited to loop reactors, but may be used in other reactor configurations, including, but not necessarily limited to, multiple CSTRs, e.g. in series.

FIG. 1 shows a schematic illustration of four loop lines in a conventional polypropylene plant that have been used in copolymer production. Trains such as this have been used for metallocene catalyst trials with production capacity of several kton/year, as a non-restrictive example. Its process includes both polymerization reactor, which turns the monomer into polymer fluff, fluff granule devolatilization and stabilization, and the polymer extrusion, which turns the fluff into pellets, all of which follow the process shown in FIG. 1.

Shown in FIG. 1 is a four-legged loop reactor 10 of in one non-limiting embodiment used to produce low melting point copolymer resin. The circulation amps (power), however, are correlated to the viscosity of the slurry system, which closely relies on the solid content, fluff morphology and media temperature. Ethylene comonomer is conventionally injected at only one point 14, generally after hydrogen injection 16, in one non-restrictive version. Polymerization in the presence of hydrogen is optional; in some cases hydrogen serves as an important chain transfer agent to modify the melt flow of the copolymer.

During the preparation of copolymer having a melt flow (MF) of 8 to 10 g/10 min resin with a catalyst having activity of a few kg/hr, the lifetime of the growing polymer chain on the catalyst center may be about a second or two. This means that each active center will form about ten different polymer chains during one circulation. If there is only one ethylene injection port 14, as is the case for a conventional slurry loop reactor, the ethylene concentration along the loop then decreases because of the consumption for RCP production.

Catalyst residence times may range from about 45 minutes to 2 hours. If multiple reactors are used in series, then residence times may be from about 3 to about 6 hours, depending upon the number of reactors, and if the reactors are single loop, double loop, whether a gas phase reactor is present, a combination thereof, etc.

In one non-limiting embodiment the process herein applies to pseudo-plug flow reactors, whether loop, straight, or of another configuration. Pseudo-plug flow reactors are defined herein as reactors where all of the molecules spend approximately equal time in the fast and slow regions of the flow stream, and thus have very similar residence times in the reaction zone. In pseudo-plug flow, there is limited back mixing, and the polymer chains have similar lifetimes.

During the whole catalyst time, which may be about one to two hours in one non-limiting embodiment for low MP copolymer, depending on the catalyst used, the ethylene concentration, in fact, fluctuates within a range with the average value coupled with resin melting points, but the range is, nevertheless, dependent upon the reactor configuration and production rate. However, under this steady but very dynamic reactor condition, the catalyst would incorporate more ethylene around the single injection point, producing resin with a MP lower than the target, and then softer and stickier over time and the length of the reactor. It is this small part of resin generated at the injection hot spot that would contribute its stickiness to bind fluff grains together, even resulting in relatively large agglomerations or accumulations, denoted in slang as "rocks". As previously noted, the circulation power (measured in amperes) increases when this occurs, as the fluff size gets larger, sometimes containing some extraordinary agglomerates or accumulations.

It has been discovered that distributing the olefin comonomer (e.g. ethylene) into the loop reactor at different points or ports permits the average concentration to be more uniformly maintained the same, and the fluctuation range may be much narrower. The variation range is dependent on both the number of injection ports, the injection rate at each port, the production rate and solids content.

The steady but dynamic process character of loop reactors is not only exhibited on the ethylene comonomer concentration distribution, but also on the periodic spreading of solids content, hydrogen concentration (as an important chain transfer additive), and even catalyst concentration. All of these concentration gradients vary through the reactor in complex ways, for instance different catalysts consume comonomers at different rates. It will be appreciated that the number of injection points (or ports) is not particularly critical, although as one might expect, the greater the number of injection points, the easier it is to distribute the olefin comonomer evenly. In one non-limiting embodiment, the number of injection points is at least 4, in another non-restrictive form, the number is at least 5, and alternatively at least 6.

In one non-limiting embodiment, it is expected that variation of the ethylene concentration could be greater in reactor lines that are larger and longer as compared with smaller and shorter lines. Thus, the material composition and therefore physical properties of the copolymer produced by a one injection port process on a smaller shorter reaction line would be different from RCP produced on a multi-injection point larger/longer line, even though the melting point by differential scanning calorimetry (DSC) measurement would be the same. For instance, the organoleptic content of the copolymer would be improved, and the olefin comonomer distribution would be more uniform.

Some expectations for the process described herein include, but are not necessarily limited to one or more of the following:

To achieve the same MF and melting point, the operation conditions may be different for single- and multi-injection ports processes.

The resulting copolymer material composition would thus be different, even if the material has same MP and MF, and therefore may offer different mechanical and physical properties. For homopolymerization, the MWD of the resins may be tuned or controlled by the hydrogen monitoring through mono- and multi-injection ports, depending on catalyst profiles of kinetics and chain transfer rate.

Based on these new concepts, a conventional slurry loop reactor would be modified as demonstrated in FIG. 1 in the gray lines and arrows for multiple α-olefin comonomer injection at four points 14, 20, 22, and 24. There is nothing critical about the placement of these injection points, although distribution along the length of the reactor is suggested.

Minimal capital investment is required to retrofit existing reactors since injection points may be at places where valves and other conduits are already present. It will be appreciated that in retrofitting current reactors it may be that the ports can not be necessarily evenly distributed. Optionally, the flow rate of each port could be controlled by using micro flow meters. The numbers shown in FIG. 1 are some possible flow rate values for each line that may be reached in one non-limiting embodiment, but it will be appreciated that such values cannot be specified in advance and are dependent upon a number of complex, interrelated factors, including but not necessarily limited to, the type of copolymer made, the catalyst system used, the flow rate, the desirable copolymer properties, the reaction conditions, etc. The monomer flow rate may be optionally controlled through one micro flow meter for all injection points.

As noted in FIG. 1, not all of the olefin comonomer injection points may have the same flow rate. It is expected that a common implementation of the method, particularly in retrofitting an existing plant, may not be able to have the injection points evenly distributed and the flow rates at each point are adjusted to provide uniform distribution as much as possible. Consequently, the flow rate at each injection point is likely to be different from that at another point. Of course, in the case where a polymerization reactor is being designed for multiple comonomer injection, the multiple injection ports may be designed and built evenly distributed along the length of the reactor. It is expected that the mechanical and physical properties of copolymer may be improved through the process herein.

The utility of this process may be applied to improve production of metallocene-based random copolymers as well as more traditional ZN random copolymers. The use of multiple injection points is particularly useful to improve circulation properties in loop reactors and avoid production of agglomerations (e.g. "rocks") that impair pumping and product transport of copolymer fluff granules.

In summary, the loop reactor process herein relates to the production of copolymers, especially for the low melting point copolymers which conventional reactor technology may have difficulty producing by the bulk polymerization method due to the stickiness of the soft materials. In one non-restrictive version, the method herein could be used advantageously to make copolymers having melting points below about 100–170° C., and alternatively the lower threshold may be about 110° C. and in another non-limiting embodiment the upper threshold may be about 140° C.

The process is expected to be useful where the olefin comonomer content in the copolymer ranges from about 0.1 to about 15% by weight based on the total weight of the propylene monomer, and in an alternative embodiment ranges from about 1 to about 10 wt %.

Moreover, it is expected that the new production approach will change the material composition of the copolymer from that made by the conventional technique, indicating that given the same MP and MF and even ethylene content, the final product would show different mechanical and physical properties. In fact, it is anticipated that the ethylene distribution would be steadier or more uniformly distributed amongst both inter- and intramacromolecules, thus providing lower organoleptic content.

When the polymers produced in accordance with the process herein are employed to produce articles by a processing technique, such as injection molding, injection or extrusion blow molding, or production of films, or extrusion of pipes, fibers, tubes or profiles, the copolymer may be employed either in its pure form, or in a blend. When used pure, the copolymer may be a layer of a multilayer (e.g. multisheet laminate) or any other type of construction. These products and articles may be made by processes and apparatus well known to those skilled in the art.

In the foregoing specification, the methods and compositions have been described with reference to specific embodiments thereof, and has been demonstrated as effective in providing methods for preparing random copolymers using ZN or metallocene catalysts. However, it will be evident that various modifications and changes may be made to the method herein without departing from the broader spirit or scope of the process and random copolymers as set forth in the appended claims. Accordingly, the specification is to be regarded in an illustrative rather than a restrictive sense. For example, specific introduction rates and injection points falling within the claimed parameters, but not specifically identified or tried in a particular copolymer preparation method, are anticipated and expected to be within the scope of this invention. Further, the process of producing polyolefins may be conducted under conditions (temperature, pressure, feed rates, etc.) other than those exemplified herein.

What is claimed is:

1. A process for producing a copolymer, comprising: polymerizing in a linear liquid slurry or gas phase reactor a polypropylene product from propylene in the presence of a polymerization catalyst; injecting at least one olefin comonomer at more than one point along the length of the reactor; and recovering a copolymer of propylene and olefin comonomer.

2. The process of claim 1 where the reactor is a loop reactor and the process further comprises injecting the olefin comonomer at more than one point in the loop.

3. The process of claim 1 wherein the injection points are adapted to reduce a tendency of copolymer fluff grains to agglomerate as compared with an otherwise identical process where olefin comonomer is injected at one point.

4. The process of claim 1 where the copolymer has a melting point of about 170° C. or less.

5. The process of claim 1 where the total amount of all olefin comonomer comprises from about 0.1 to about 15% by weight based on the total weight of the propylene monomer.

6. The process of claim 1 where the reactor is a loop reactor.

7. A process for producing a copolymer, comprising: polymerizing in a linear liquid slurry loop reactor a polypropylene product from propylene in the presence of a polymerization catalyst; injecting at least one olefin comonomer at more than one point along the length of the reactor; and recovering a copolymer of propylene and olefin comonomer that has reduced substantially amorphous polypropylene content as compared with a process where the olefin comonomer is introduced at one point.

8. The process of claim 7 where the reactor is a loop reactor and the process further comprises injecting the olefin comonomer at more than one point in the loop.

9. The process of claim 7 wherein the injection points are adapted to reduce a tendency of copolymer fluff grains to agglomerate as compared with an otherwise identical process where olefin comonomer is injected at one point.

10. The process of claim 7 where the copolymer has a melting point of about 170° C. or less.

11. The process of claim 7 where the total amount of all olefin comonomer comprises from about 0.1 to about 15% by weight based on the total weight of the propylene monomer.

12. A copolymer produced by a process comprising: polymerizing in a linear liquid slurry or gas phase reactor a polypropylene product from propylene in the presence of a polymerization catalyst; injecting at least one olefin comonomer at more than one point along the length of the reactor; and recovering a random copolymer of propylene and olefin comonomer that has a more uniform distribution of olefin comonomer as compared to a copolymer produced by an otherwise identical process except that the olefin comonomer is injected at one point.

13. The copolymer of claim 12 where the reactor is a loop reactor and the process further comprises injecting the olefin comonomer at more than one point in the loop.

14. The copolymer of claim 12 wherein the injection points are adapted to reduce a tendency of copolymer fluff grains to agglomerate as compared with an otherwise identical process where olefin comonomer is injected at one point.

15. The copolymer of claim 14 where the copolymer has a melting point of about 170° C. or less, and the melting point of the copolymer remains essentially the same as compared with an otherwise identical process where olefin comonomer is injected at one point.

16. The RCP of claim 12 where the total amount of all olefin comonomer comprises from about 0.1 to about 15% by weight based on the total weight of the propylene monomer.

17. A copolymer produced by a process comprising: polymerizing in a linear liquid slurry loop reactor a polypropylene product from propylene in the presence of a polymerization catalyst; injecting at least one olefin comonomer at more than one point along the length of the reactor; and recovering a copolymer of propylene and olefin comonomer that has a more uniform distribution of olefin comonomer and a reduced substantially amorphous polypropylene content as compared to a copolymer produced by an otherwise identical process except that the olefin comonomer is injected at one point.

18. The copolymer of claim 17 where the reactor is a loop reactor and the process further comprises injecting the olefin comonomer at more than one point in the loop.

19. The copolymer of claim 17 wherein the injection points are adapted to reduce a tendency of copolymer fluff grains to agglomerate as compared with an otherwise identical process where olefin comonomer is injected at one point.

20. The copolymer of claim 19 where the copolymer has a melting point of about 170° C. or less, and the melting point of the copolymer remains essentially the same as compared with an otherwise identical process where olefin comonomer is injected at one point.

21. The copolymer of claim 17 where the total amount of all olefin comonomer comprises from about 0.1 to about 15% by weight based on the total weight of the propylene monomer.

22. An article of manufacture comprising a film, sheet, fiber, or article comprising the resin of claim 12 where the film, sheet, fiber or article is prepared using a process selected from the group consisting of extrusion, blowing, injection molding, and casting.

23. The article of manufacture of claim 22, where the film, sheet, fiber or article is formed into an article selected from the group consisting of bags, containers, and tubes.

24. An article of manufacture comprising the resin of claim 12 prepared using a processing technique selected from the group consisting of injection molding, injection blow molding, extrusion blow molding, casting, and extrusion.

\* \* \* \* \*